(12) United States Patent
Hawley

(10) Patent No.: US 7,766,275 B2
(45) Date of Patent: Aug. 3, 2010

(54) AIRCRAFT HAVING A PIVOTABLE POWERPLANT

(75) Inventor: Arthur V. Hawley, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 922 days.

(21) Appl. No.: 11/451,216

(22) Filed: Jun. 12, 2006

(65) Prior Publication Data

US 2009/0072079 A1  Mar. 19, 2009

(51) Int. Cl.
*B64D 27/18* (2006.01)
*B64C 3/32* (2006.01)

(52) U.S. Cl. .................................... 244/56; 244/36

(58) Field of Classification Search ............ 244/23 D, 244/12.4, 56, 36
See application file for complete search history.

(56) References Cited

U.S. PATENT DOCUMENTS

| | | | | |
|---|---|---|---|---|
| 2,961,188 A | * | 11/1960 | Taylor | 244/12.4 |
| 2,964,264 A | * | 12/1960 | Multhopp | 244/12.4 |
| 3,099,420 A | * | 7/1963 | Messerschmitt et al. | 244/12.4 |
| 4,019,699 A | * | 4/1977 | Wintersdorff et al. | 244/121 |
| 4,969,614 A | * | 11/1990 | Capuani | 244/12.4 |
| 5,758,844 A | * | 6/1998 | Cummings | 244/7 C |
| 5,893,535 A | * | 4/1999 | Hawley | 244/119 |
| 2003/0192986 A1 | * | 10/2003 | Page et al. | 244/36 |
| 2005/0230520 A1 | * | 10/2005 | Kusic | 244/12.4 |

OTHER PUBLICATIONS

Presentation: 2000 International Powered Lift Conference, V/STOL Fighter Programs in Germany: 1956-1975, presented by Mike Hirschberg, Answer, Inc, Nov. 1, 2000.

* cited by examiner

*Primary Examiner*—Tien Dinh

(57) ABSTRACT

Aircraft including an airframe having a fuselage extending between a forward end and an aft end opposite the forward end. The aircraft further includes a powerplant pivotally connected to the fuselage adjacent the aft end. The powerplant produces exhaust during operation of the aircraft. The powerplant is selectively pivotable to direct exhaust at multiple angles with respect to the fuselage.

10 Claims, 3 Drawing Sheets

AIRCRAFT HAVING A PIVOTABLE POWERPLANT

BACKGROUND OF THE INVENTION

The present invention relates to aircraft and, more particularly, to aircraft having a pivotable powerplant.

Engines or powerplants of most conventional aircraft are fixedly mounted within an airframe of the aircraft, on the tail of the aircraft, or on aircraft wings. Fixedly mounting powerplants in these locations has various drawbacks including challenges related to aircraft control and installation, inspection, repair, and removal of the powerplants. It is often desirable to vector exhaust from powerplants to provide thrust at various angles with respect to the airframe of the aircraft. For aircraft having one or more powerplants mounted within the airframe, vectoring is usually accomplished by deflecting powerplant exhaust to exit the aircraft at angles between about horizontally rearward and vertically downward with respect to the airframe. For example, some conventional aircraft have vanes connected to the airframe downstream of the powerplant for selectively deflecting exhaust produced by the airframe downward to various degrees with respect to the airframe. Deflecting powerplant exhaust to provide thrust in various directions is generally inefficient because energy of the exhaust is reduced when it is deflected thereby decreasing thrust produced by the aircraft.

For vectoring exhaust from powerplants mounted on the wings to exit the aircraft at various angles, the wings of some conventional aircraft can rotate with respect to the airframe. When the wings of these aircraft are rotated, the wings and powerplants mounted thereon rotate together. One drawback of these aircraft is an inability to orient the wings in their forward flight or home position while vectoring exhaust to exit the aircraft at an angle with respect to the airframe below horizontally rearward. Although it is sometimes desirable to rotate the wings and powerplants of such aircraft together, for example, for flying vertically, it would also be advantageous at times to be able to selectively vector the exhaust to exit the aircraft at angles above and below horizontally rearward while keeping the wings in their home position. For example, as will be appreciated by those skilled in the art, vectoring exhaust to exit the aircraft at angles above and below horizontally rearward while maintaining the wings in their home position could facilitate many intermediate flight maneuvers between forward flight and vertical flight. Further, vectoring exhaust to exit the aircraft at angles other than horizontally rearward while keeping the wings in a home position can improve landing and take off, as described in the Detailed Description of the Invention section below.

Installation, inspection, repair, and removal of powerplants are often challenging. Installing and repairing powerplants mounted in the fuselage require accessing and working within a usually close-quartered interior of the fuselage. The need to access and work within the fuselage increases the complexity and cost of installing, inspecting, maintaining, and removing the powerplant. For most conventional aircraft designs, installing and removing and, sometimes, inspecting and repairing powerplants requires using a boom or crane to hold the engine at or adjacent its position on the aircraft, far above ground level. Personnel must also climb or be lifted to the powerplant position for installation, inspection, repair, and removal. Aircraft assembly and maintenance would be improved if the powerplant position on the aircraft was more easily accessed from the ground.

Further, conventional aircraft having a powerplant mounted within its fuselage require ancillary structure sometimes including heavy ductwork for channeling the exhaust to an orifice through which the exhaust exits the aircraft. These aircraft also have heat and acoustic barriers to insulate the fuselage, cockpit, storage bays, and/or other internal structures from the powerplant. Some or all of these barriers are not needed when the powerplant is mounted outside of the fuselage.

BRIEF SUMMARY OF THE INVENTION

The present invention relates to aircraft including an airframe having a fuselage extending between a forward end and an aft end opposite the forward end. The aircraft further includes a powerplant pivotally connected to the fuselage adjacent the aft end. The powerplant produces exhaust during operation of the aircraft. The powerplant is selectively pivotable to direct exhaust at multiple angles with respect to the fuselage.

In another aspect, the present invention relates to a method of operating aircraft having an airframe including a fuselage and extending from a forward end to an aft end and a powerplant pivotally mounted on the fuselage adjacent the aft end. The method includes producing exhaust using the powerplant. The method further includes pivoting the powerplant with respect to the fuselage to direct the exhaust at multiple angles with respect to the fuselage.

In yet another aspect, the present invention relates to a vehicle including a primary body extending between a forward end and an aft end opposite the forward end. The vehicle further includes a powerplant pivotally connected to the primary body adjacent the aft end producing exhaust during operation of the vehicle. The powerplant is selectively pivotable to direct exhaust at multiple angles with respect to the body.

In still another aspect, the present invention relates to a method of maintaining aircraft having an airframe extending from a forward end to an aft end and a powerplant pivotally mounted on the fuselage adjacent the aft end. The method includes pivoting the powerplant with respect to the fuselage to a pivoted position while the aircraft is standing still. The method further includes performing maintenance after the powerplant has been pivoted to the pivoted position.

Other aspects of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE INVENTION

Figure 1:
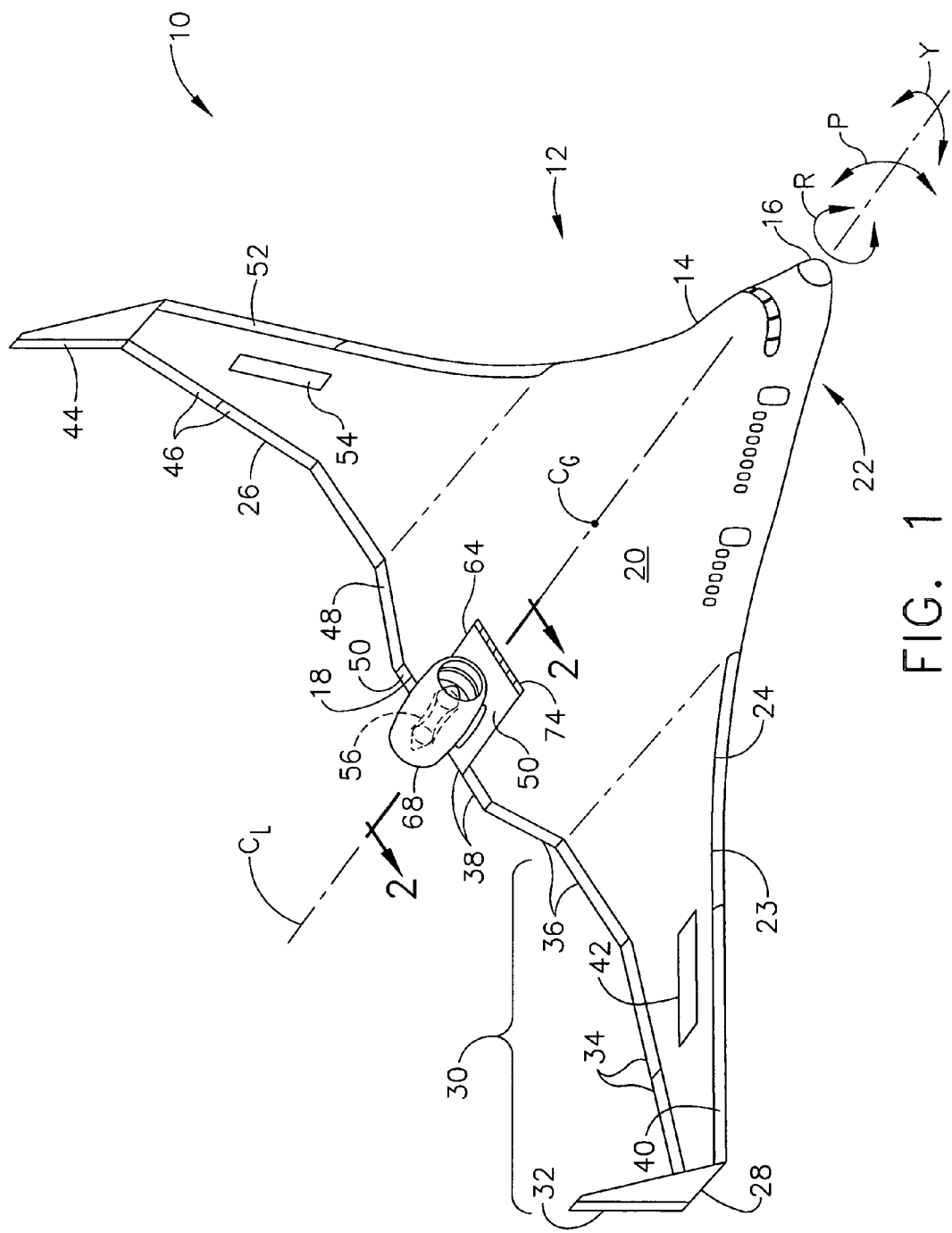
FIG. 1 is a perspective of aircraft according to a first embodiment of the present invention.

Referring to the figures, and more particularly to FIG. 1, aircraft according to a first embodiment of the present invention is designated in its entirety by reference number 10. The aircraft 10 has an airframe, generally designated by 12, including a fuselage 14. The airframe 12 has a nose or forward end 16 and a tail or aft end 18 opposite the forward end. Although the airframe 12 may have other maximum lengths measured between the forward end 16 and the aft end 18 without departing from the scope of the present invention, in one embodiment the airframe has a maximum length of between about 120 feet and about 130 feet. The airframe 12 further has a top 20 extending between the forward end 16 and the aft end 18 and a bottom 22 opposite the top. Although the airframe 12 may have other maximum heights measured between the top 20 and the bottom 22 without departing from the scope of the present invention, in one embodiment the fuselage has a maximum height of between about 15 feet and about 18 feet. The airframe 12 further includes at least two wings 23 extending laterally from the fuselage 14. Each wing 23 has a forward edge 24, an aft edge 26 opposite the forward edge, and a wing tip 28 opposite the fuselage 14. Although the aircraft 10 may have other wingspans extending between the wingtips 28 without departing from the scope of the present invention, in one embodiment the aircraft has a wingspan of between about 190 feet and about 200 feet.

The aircraft 10 further includes multiple control surfaces 30 independently pivotally connected to the airframe 12. The control surfaces 30 may be pivotally connected to the airframe in various ways including using conventional track systems (not shown) and by conventional hinge assemblies. During operation of the aircraft 10, the control surfaces 30 are selectively pivoted to affect air passing over the control surfaces thereby controlling aircraft attitude during flight or facilitating aircraft take off or landing. As will be apparent to those skilled in the art, the affect the control surfaces 30 have on the air passing over the aircraft 10 and thereby aircraft flight depend on many variables including a pivot position of each control surface with respect to the airframe 12 and/or fuselage 14 during operation of the aircraft. The control surfaces 30 may be connected to the aircraft 10 at various locations of the aircraft without departing from the scope of the present invention. For example, FIG. 1 shows multiple control surfaces 30 pivotally connected to the airframe 12 adjacent the aft end 18 of the airframe 12. Although the aircraft 10 may include other control surfaces 30 positioned adjacent the aft end 18 of the airframe 12 without departing from the scope of the present invention, in one embodiment the control surfaces positioned adjacent the aft end of the airframe include rudders 32, ailerons 34, flaps 36, and elevators 38. The ailerons 34 and flaps 36 are positioned adjacent the aft edge 26 of the wing 23. In one embodiment (not shown), a pivotable rudder is positioned on a tail fin or vertical stabilizer connected to the airframe 12 adjacent the aft end 18 on a longitudinal centerline $C_L$ of the airframe. The aircraft 10 may also include control surfaces 30 positioned on the airframe 12 in positions other than adjacent the aft end 18, such as slats 40 pivotally connected to the forward edge 24 of each wing 23 and a spoiler 42 positioned on each wing between the forward edge and the aft edge 26 of the wing.

Each control surface 32, 34, 36, 38, 40, 42 includes at least one outer surface 44, 46, 48, 50, 52, 54, respectively, for affecting air passing over the control surface thereby controlling flight attitude or facilitating aircraft take off or landing. Some of the control surfaces 32, 34, 36, 38, 40 have opposing outer surfaces 44, 46, 48, 50, 52, respectively. For example, the ailerons 34, flaps 36, and elevators 38 include upper outer surfaces corresponding to the top 20 of the airframe 12 and lower outer surfaces opposite the upper outer surfaces. Similarly, the rudders 32 may include a left outer surface and a right outer surface opposite the left outer surface.

Figure 2:
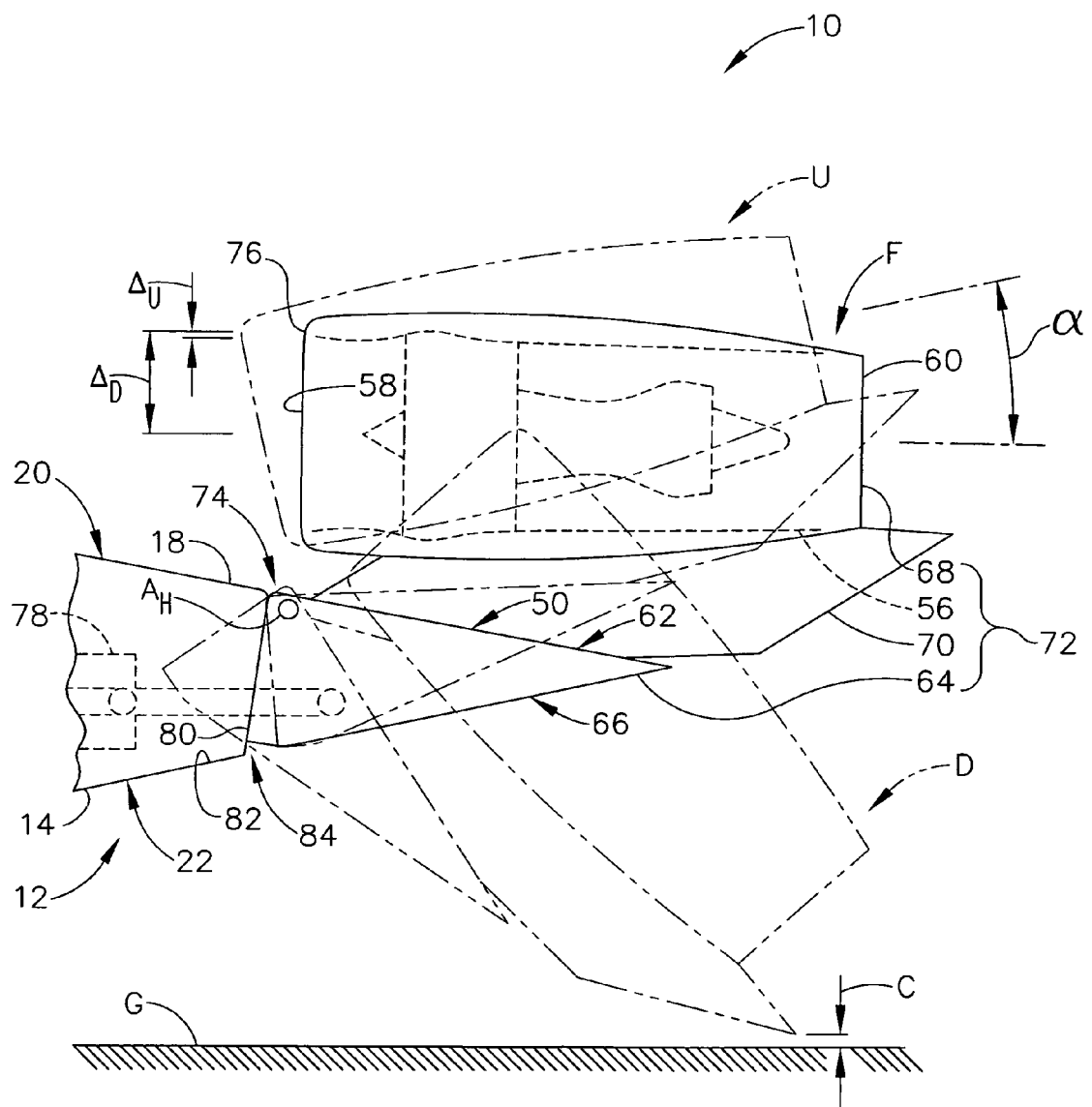
FIG. 2 is an elevation of a rear portion of the aircraft shown in FIG. 1.

The aircraft 10 further includes a powerplant or engine 56 pivotally connected to the fuselage 14 adjacent the aft end 18 of the airframe 12. The powerplant 56 is positioned on the longitudinal centerline $C_L$ of the airframe 12. As shown in FIG. 2, the powerplant 56 includes an inlet 58 and an outlet 60. The powerplant 56 receives air through the inlet 58, produces high-temperature and high-pressure gas or exhaust, and directs the exhaust out of the outlet 60 during operation of the aircraft 10 to produce thrust. Although the present invention is described with respect to an aircraft 10, the invention may be used with various vehicle types. More specifically, the powerplant 56 may be mounted on a control surface pivotally connected to a primary body of various vehicles. The primary body of these vehicles, like the fuselage 14 of the aircraft described above, extends from a forward end to and aft end and the control surface may be connected to the primary body at various locations of the primary body including adjacent the aft end of the primary body. In one particular embodiment (not shown), the primary body is a body of a boat or other aquatic vehicle. In this embodiment, the control surface affects fluid such as water passing over the control surface. Depending on the application, the powerplant may produce various types of exhaust. For example, when the vehicle is an aquatic vehicle, the powerplant may produces exhaust in the form of high-temperature and high-pressure gas or in the form of water received in the inlet of the powerplant and propelled from the powerplant at a high-pressure to produce thrust.

Although the powerplant 56 may produce other amounts of thrust without departing from the scope of the present invention, in one embodiment the powerplant produces between about 50,000 pounds and about 60,000 pounds of thrust. Although other powerplants 56 may be used without departing from the scope of the present invention, in one embodiment the powerplant is a Trent Engine available from Rolls-Royce of Derby, England.

The aircraft 10 further includes flexible or otherwise adjustable lines (not shown) connecting the powerplant 56 to various sources on the aircraft. For example, the aircraft 10 may include flexible fuel lines in fluid communication with the powerplant 56 and a fuel tank (not shown) mounted on the airframe 12 and flexible electric lines connecting the powerplant to an aircraft controller (not shown) attached to the airframe. The powerplant 56 may be positioned adjacent the top 20 and the aft end 18 of the airframe 12. For example, as shown in FIG. 2, the powerplant 56 may be mounted on an upper surface 62 of a central control surface 64 of the multiple control surfaces 30. Mounting the powerplant 56 adjacent the top 20 of the airframe 12 reduces a likelihood of foreign objects (e.g., debris propelled upward from the runway after an aircraft tire rolls over it) entering the powerplant. In one embodiment (not shown), the powerplant 56 is mounted on a lower surface 66 of the central control surface 64 adjacent the aft end 18 of the airframe 12. The powerplant 56 and the central control surface 64 are connected so they pivot together with respect to the airframe 12 and/or fuselage 14 during operation of the aircraft 10. Positioning the powerplant 56 adjacent the aft end 18 of the airframe 12 has benefits including increasing a likelihood that the inlet 58 of the powerplant will be positioned aft of any shockwaves (not shown) that may develop over the aircraft 10 during flight.

As shown in FIG. 2, the powerplant 56 is housed in a nacelle 68, a streamlined enclosure for the powerplant. The nacelle 68 is mounted on the central control surface 64 directly (not shown) or by way of an intermediate structure. For example, the nacelle 68 may be connected to a pylon 70 that is in turn mounted on the central control surface 64. In one embodiment, the nacelle 68 houses the powerplant 56 and is connected to the pylon 70 and the pylon is mounted on the central control surface 64 so the powerplant, the nacelle, the pylon, and the central control surface pivot together with respect to the airframe 12 and/or fuselage 14 during operation of the aircraft. The powerplant 56, nacelle 68, pylon 70, and central control surface 64 are collectively be referred to as the pivoting unit 72.

The aircraft 10 further includes a hinge system 74 connecting the pivoting unit 72 to the airframe 12 adjacent the aft end 18. The hinge system 74 may include a conventional hinge without departing from the scope of the present invention. The hinge system 74 may connect the pivoting unit 72 to the airframe 12 adjacent the top 20 of the airframe, as shown in FIG. 2, or adjacent the bottom 22 of the airframe (not shown). When the powerplant 56 is mounted on the same side 20, 22 of the airframe that the hinge system 74 is positioned adjacent to, the inlet 58 of the powerplant moves less during pivoting of the pivot structure 72 than it would if the powerplant were mounted on the side of the airframe that is opposite the side of the airframe that the hinge system is positioned adjacent to. For example, when the powerplant 56 is mounted on the upper surface 62 of the central control surface 64 adjacent the aft end 18 of the airframe, the inlet 58 of the powerplant moves less during pivoting when the hinge system 74 is positioned adjacent the top 20 of the airframe 12 than it would if the hinge system were positioned adjacent the bottom 22 of the airframe. When the powerplant 56 is mounted on the same side 20, 22 of the airframe 12 that the hinge system 74 is positioned adjacent to, the inlet 58 of the powerplant, being closer to a hinge axis $A_H$ of the hinge system, prescribes a smaller radius (not shown in detail) during pivoting of the pivoting unit 72 than it would if the powerplant were mounted farther from the hinge axis.

There are many benefits to limiting movement of the inlet 58 of the powerplant 56 including ensuring a more consistent quality of air entering the inlet. That is, characteristics of air entering the inlet 58, such as velocity, generally change less when the inlet 58 moves less with respect to the airframe 12 and/or fuselage 14. For example, the powerplant 56 may be positioned on the airframe 12 so the inlet 58 generally receives air from a relatively slow-moving boundary layer (not shown) passing over the aircraft 10 during flight when the pivoting unit 72 is in a home or forward flight position, designated generally by reference F in FIG. 2. In some embodiments, the powerplant 56 operates best when air entering through the inlet 58 is moving within a range of ideal speeds, such as expected speeds within a boundary layer over the aircraft 10 during flight. Although the powerplant 56 may operate best when receiving air moving at other speeds with respect to the powerplant without departing from the scope of the present invention, in one embodiment, the powerplant operates best when receiving air moving at a speed with respect to the powerplant within a range of speeds extending from a Mach number of about 0.80 to a Mach number of about 0.90.

As will be appreciated by those skilled in the art, air in some places around an object in flight, such as outside of a laminar boundary layer, moves faster than air in other places, such as within the laminar boundary layer. One skilled in the art will also understand that air in some places around an object in flight, such as air in a turbulent boundary layer, separated flow, a wake, or a vortex formed adjacent the object, may move slower than air in other places adjacent the object, such as within a laminar boundary layer moving over the object. If the powerplant 56 is poorly positioned and/or the inlet 58 of the powerplant is moved too far from its forward flight position F when pivoting the pivoting unit 72 during flight, the inlet may receive air moving above or below the ideal range of intake air speeds for the powerplant. Powerplant 56 efficiency generally decreases when it takes in air moving outside of the ideal range of intake air speeds. Further, the powerplant 56 may stall if the air is too far outside the range.

As shown in FIG. 2, using a top portion 76 of the inlet 58 as a reference, the inlet moves a relatively small vertical distance $\Delta_U$ when the pivoting unit 72 is pivoted upward from the forward flight position F to an up position, generally designated by reference U, compared to if the pivoting unit were hinged to the airframe 12 adjacent the bottom 22. FIG. 2 also shows that the top portion 76 of the inlet 58 moves a relatively small vertical distance $\Delta_D$ when the pivoting unit is pivoted downward from the forward flight position to a down position, generally designated by reference D, compared to if the pivoting unit were hinged to the airframe 12 adjacent the bottom 22. The pivoting unit 72 is also pivotable to a variety of intermediate positions (not shown in detail) between the up position U and the down position D. Although the top portion 76 of the inlet 58 of the powerplant 56 may move by other maximum vertical distances $\Delta_U$ when the pivoting unit 72 is pivoted from the forward flight position F to the up position U without departing from the scope of the present invention, in one embodiment the top portion of the inlet moves a maximum vertical distance of between about 0 inches and about 5 inches when the pivoting unit is pivoted from the forward flight position to the up position. Although the top portion 76 of the inlet 58 of the powerplant 56 may move by other maximum vertical distances $\Delta_D$ when the pivoting unit 72 is pivoted from the forward flight position F to the down position D without departing from the scope of the present invention, in one embodiment the top portion of the inlet moves a maximum vertical distance of between about 0 inches and about 5 inches when the pivoting unit is pivoted from the forward flight position to the down position.

Hinging the powerplant 56 to the airframe 12 adjacent the top 20 of the airframe as shown in FIG. 2 also allows a greater ground clearance C when the aircraft 10 is parked and the pivoting unit 72 is pivoted downward than if the powerplant were hinged to the airframe adjacent the bottom 22 of the airframe. In addition, mounting the powerplant 56 on the upper surface 62 of the central control surface 64 allows a greater ground clearance C between the pivoting unit 72 when the aircraft 10 is taxiing, taking off, or landing on the ground G and the pivoting unit is pivoted downward than if the powerplant were mounted on the lower surface 66 of the central control surface. Moreover, mounting the powerplant 56 on the upper surface 62 of the central structure 64 also generally results in less noise from the powerplant emanating to the ground G during flight because the powerplant is separated from the ground by other parts of the aircraft 10 such as the central control surface 64 compared to the powerplant being mounted on the lower surface 66 of the central control surface.

As shown in FIG. 2, the aircraft 10 further includes an actuation system 78 mounted on the airframe 12 and operatively connected to the central control surface 64 for pivoting the central control surface and thereby pivoting the entire pivoting unit 72 about the hinge system 74 during operation of the aircraft. Although the actuation system 78 may include other types of actuators without departing from the scope of the present invention, in one embodiment the actuator system includes a screw-jack actuator or a hydraulic actuator. The actuator system 78 may push and pull a portion of the pivoting unit 72, such as a lower portion 80 of the pivoting unit, to move the pivoting unit about the hinge system 74. The actuation system 78 may connect the central control surface 64 to the airframe 12 adjacent the bottom 22 of the airframe 12. In one embodiment (not shown), the actuation system 78 is part of or positioned adjacent the hinge system 74.

The aircraft 10 may also include a compartment 82 for receiving a portion of the pivoting unit 72 when the pivoting unit is pivoted. For example, as shown in FIG. 2, the compartment 82 may be positioned and configured to receive the lower portion 80 of the central control surface 64 during operation of the aircraft 10. As shown in FIG. 2, for example, the compartment 82 allows the pivoting unit 72 to pivot downward so the powerplant 56 can direct exhaust to exit the aircraft at an angle below horizontally rearward by receiving the lower portion 80 of the central control surface 64. The aircraft 10 has a gap 84 between the aft end 18 of the airframe 12 and the lower portion 80 of the central control surface 64 to allow relative motion. The gap 84 may be sealed by a flap system (not shown in detail) to limit air passing over the aircraft 10 from entering between the aft end 18 of the airframe 12 and the lower portion 80 of the central control surface 64 as the pivoting unit 72 pivots between its various positions.

The powerplant 56 may be selectively pivoted with respect to the airframe 12 and/or fuselage 14 to direct exhaust to exit the aircraft 10 at multiple angles $\alpha$ with respect to the airframe and/or fuselage. Although the powerplant 56 may be selectively pivotable to direct exhaust to exit the aircraft 10 at other angles $\alpha$ with respect to the fuselage 14 without departing from the scope of the present invention, in one embodiment the powerplant is selectively pivotable to direct exhaust to exit the aircraft at an angle with respect to the fuselage within a range of angles extending from about 10° above horizontal and about 10° below horizontal.

A user may pivot the central control surface 64 for a variety of reasons while the aircraft 10 is parked, taking off, in flight, or landing. When the aircraft 10 is parked, the central control surface 64 and the powerplant 56 may be pivoted downward together close to the ground G for easy maintenance of the aircraft and powerplant including installation, repair, or inspection of the powerplant. Maintenance of the aircraft 10 and powerplant 56 may also include removal of the powerplant from the fuselage 14. In this way, the powerplant 56 may be installed, inspected, repaired, and removed without using complex support systems such as cranes or booms commonly used to hold the powerplant and/or personnel during manufacture and maintenance of conventional aircraft or at least the process of maintaining the aircraft 10 and powerplant will be facilitated.

The central control surface 64 and powerplant 56 may also be pivoted to facilitate takeoff of the aircraft 10. For example, the powerplant 56 may be pivoted upward to provide a tail-down or nose-up moment about a center of gravity $C_G$ (shown in FIG. 1), which raises the nose, keeps the nose from dropping, or decreases a downward force of the aircraft on a nose wheel (not shown) extending between the forward end 16 of the airframe 12 and the ground G. In one embodiment, exhaust exhausted from the powerplant 56 is directed along a line (not shown) through or above the center of gravity $C_G$ when the powerplant is in its forward flight position F. As will be appreciated by those skilled in the art, producing thrust along a line passing through the center of gravity $C_G$ of the aircraft 10 generally does not produce a moment about the center of gravity $C_G$. When the powerplant 56 shown in FIG. 2 is pivoted upward sufficiently, its exhaust is directed along a line that is below the center of gravity $C_G$ thereby creating a nose-up moment about the center of gravity. The nose-up moment is especially helpful for aircraft that otherwise would have trouble lifting its nose during take of, such as aircraft lacking elevators 38, having small elevators, or having elevators positioned relatively close to the center of gravity $C_G$ (i.e., forming a short moment arm between the elevator and center of gravity) so they provide less nose-up moment than desired.

Providing a nose-up moment using the powerplant 56 is also helpful for aircraft 10 in which the elevators 38 are less effective because of their position on the airframe 12. For example, pivotally connecting the elevators 38 to the aft end 18 of the airframe, though desirable for other reasons, may result in less elevator power than if they were positioned on an elevated tail stabilizer (not shown) of the aircraft as on many conventional aircraft. Further, some embodiments of the aircraft 10 lack the trimming control (i.e., controlling aircraft movement about its center of gravity $C_G$) conventionally provided by stabilizers. The nose-up moment created by the pivoting powerplant 56 may supplement elevator power created by the elevators 38 and the powerplant may selectively provide trimming stability during takeoff.

The control surfaces 30 may be adjusted with respect to the airframe 12 and/or fuselage 14 to facilitate takeoff. Specifically, the control surfaces 30 may be independently pivoted with respect to the airframe 12 and/or fuselage 14 so that their respective outer surfaces 44, 46, 48, 50, 52, 54 affect air passing over the control surfaces in a desired manner to control the aircraft 10 during takeoff. Selectively pivoting the central control surface 64 during powerplant 56 operation may simultaneously facilitate takeoff by controlling the angle $\alpha$ of thrust provided by the powerplant and selectively affecting air passing over the outer surfaces 62, 66 of the central control surface.

The powerplant 56 may be pivoted with respect to the airframe 12 and/or fuselage 14 to facilitate landing in a similar manner as that described in the immediately preceding paragraph regarding takeoff. Namely, the powerplant 56 may be pivoted with respect the airframe to create a nose-up or nose-down moment as desired to facilitate landing. For example, if a pilot wanted to raise the nose during landing, the pilot could pivot the powerplant 56 upward with respect to the airframe 12 and/or fuselage 14 from the forward flight position F to produce thrust along a line that is below the center of gravity $C_G$. Conversely, if a pilot wanted to lower the nose during landing, the pilot could pivot the powerplant 56 downward with respect to the airframe 12 and/or fuselage 14 from the forward flight position F to provide thrust along a line that is above the center of gravity $C_G$.

Providing a nose-up or nose-down moments using the powerplant 56 is also helpful for aircraft 10 in which the elevators 38 are less effective for creating nose-up moments for reasons including those described above. Further, the nose-up moment created by the pivoting powerplant 56 may supplement elevator power created by the elevators 38 and the provide trimming stability during landing. The control surfaces 30 may also be adjusted with respect to the airframe 12 and/or fuselage 14 to facilitate landing. Specifically, the control surfaces 30 may be independently pivoted so that their respective outer surfaces 44, 46, 48, 50, 52, 54 affect air passing over the control surfaces in a desired manner to control the aircraft 10 during landing.

During flight, the user may selectively adjust positions of the control surfaces 30 and an orientation and operation of the powerplant 56 to control aircraft 10 attitude. For example, the central control surface 64 and the powerplant 56 may be selectively pivoted together to direct exhaust to exit the aircraft 10 at various angles $\alpha$ with respect to the airframe 12 and/or fuselage 14 to control the aircraft as desired. The user may selectively pivot the central control surface 64 about the hinge system 74 using the actuation system 78. Selectively pivoting the central control surface 64 during powerplant 56 operation controls aircraft attitude by controlling the angle α of thrust provided by the powerplant while selectively affecting air passing over the outer surfaces 62, 66 of the central control surface. The powerplant 56 is selectively pivoted up or down to create a desired nose-up moment or nose-down moment, respectively, as described above. These moments affect aircraft pitch. Directions of changes in aircraft pitch are designated by P in FIG. 1. The powerplant 56 and/or the outer surfaces 30 may also be selectively adjusted to control aircraft roll and yaw. Directions of changes in aircraft roll and yaw are designated by R and Y, respectively, in FIG. 1. As an example, the central control surface 64 and powerplant 56 may be pivoted upward together, a rudder 32 on the right side of the aircraft 10 pivoted inward, and a rudder on the left side of the aircraft pivoted outward to simultaneously pitch the aircraft nose 16 up and yaw the nose toward the left. As another example of attitude control, the central control surface 64 and powerplant 56 may be pivoted downward together, a right aileron 34 pivoted upward, and a left aileron left in a home position or pivoted downward to simultaneously pitch the aircraft nose 16 down and roll the right side of the aircraft down. As mentioned in the preceding paragraphs, the elevators 38 of some embodiments of the present invention provide less elevator power because of their size and/or position on the aircraft 10 and some do not have stabilizers. The nose-up moment created by the pivoting powerplant 56 may supplement elevator power created by the elevators 38 and trim the aircraft 10 to stabilize flight.

The powerplant 56 and control surfaces 30 may also be adjusted to control drag on the aircraft 10. Flight under various conditions results in various lift and drag forces on the aircraft 10. Under some conditions, the aircraft 10 would operate more efficiently if the drag characteristics where changed. During flight, the central control surface 64 and powerplant 56 can be pivoted to achieve desired drag characteristics. The other control surfaces 30 may also be selectively adjusted along with the powerplant 56 to control aircraft 10 drag. As will be apparent to those skilled in the art, the powerplant 56 and control surfaces 30 may also be adjusted to control aircraft 10 speed. For example, the powerplant 56 may be adjusted to provide more or less thrust to control speed. Further, one or more of the outer surfaces 30 can be adjusted to affect air passing over them to slow the aircraft 10 or allow it to accelerate.

Figure 3:
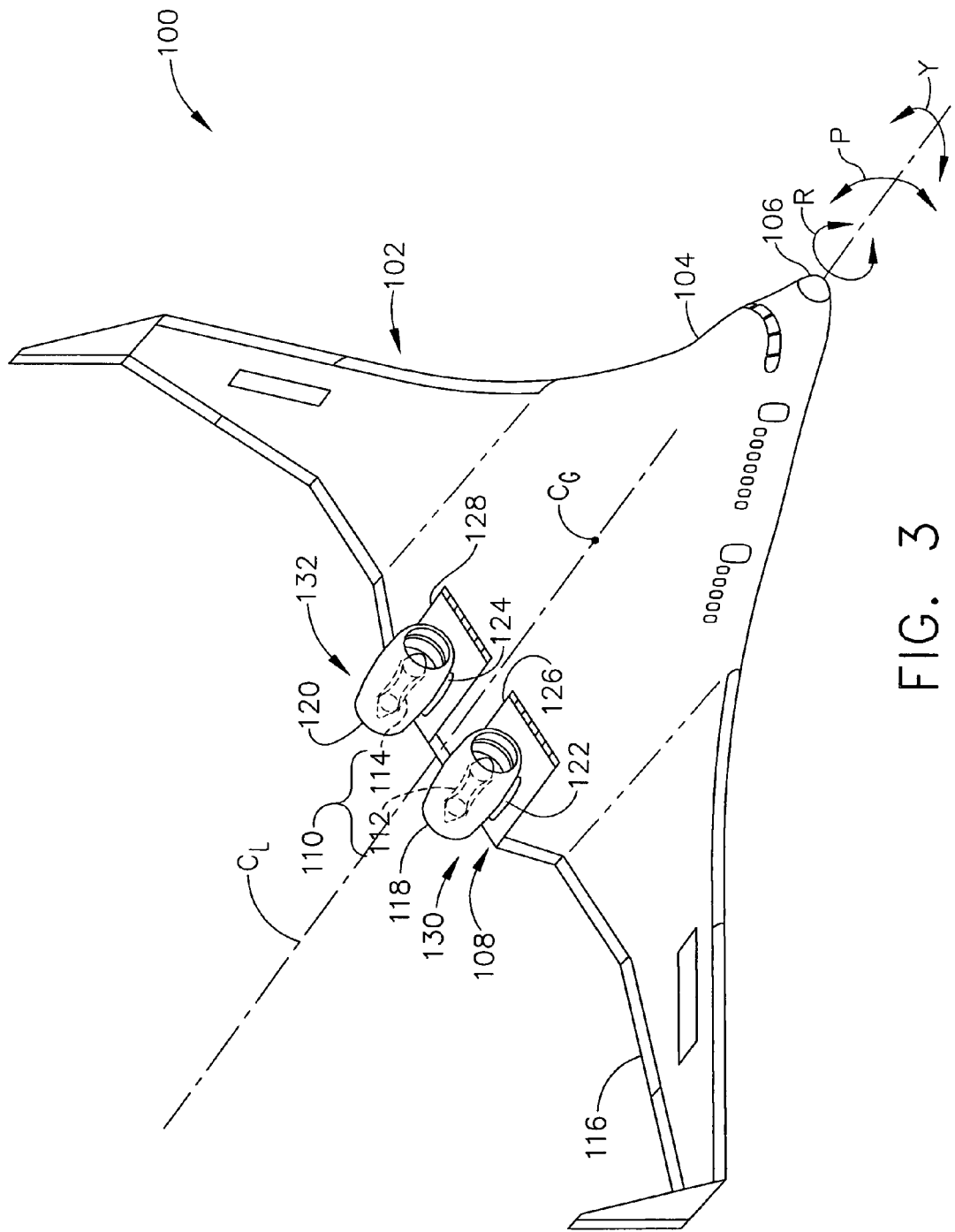
FIG. 3 is a perspective of aircraft according to a second embodiment of the present invention.

FIG. 3 shows aircraft 100 according to a second embodiment of the present invention. The aircraft 100 according to this embodiment has an airframe 102 including a fuselage 104 that extends between a forward end 106 and an aft end 108 opposite the forward end. The aircraft 100 includes multiple powerplants 110 pivotally connected to the airframe 102 adjacent the aft end 108. For embodiments of the aircraft 10 having an even number of powerplants 110, such as the two shown in FIG. 3, the powerplants are evenly distributed about a longitudinal centerline $C_L$ of the aircraft. For embodiments of the aircraft 10 having an odd number of powerplants (not shown), one of the powerplants is positioned on the centerline $C_L$ and the others are evenly distributed to the left and right of the longitudinal centerline. Although FIG. 3 shows the aircraft 100 having two powerplants 110, the number of powerplants is not limited. For example, in various embodiments (not shown in detail) the aircraft 100 includes 4, 6, and 8 powerplants 110, respectively.

The powerplants 110 may be independently pivoted with respect to the airframe 102 and/or fuselage 104. For example, a right powerplant 112 of the multiple powerplants 110 may be pivoted in one direction by a certain degree while a left powerplant 114 of the multiple powerplants is pivoted in another direction and/or to a different degree. Although each powerplant 112, 114 may be pivotable to direct exhaust to exit the aircraft 100 at other angles (similar to the angle α shown in FIG. 2) with respect to the airframe 102 and/or fuselage 104 without departing from the scope of the present invention, in one embodiment each powerplant is pivotable to direct exhaust to exit the aircraft at angles within a range of angles extending from about 10° above horizontal and about 10° below horizontal.

As in previous embodiments, the aircraft 100 includes multiple control surfaces 116 pivotally connected to the airframe for selectively affecting air passing over the aircraft. The control surfaces 116 affect air passing over them in a manner depending in part on pivot positions of the control surfaces. Also as in previous embodiments, each powerplant 112, 114 may be housed in a nacelle 118, 120. Each nacelle 118, 120 is connected to a corresponding pylori 122, 124 and each pylori is mounted on a corresponding supporting control surface 126, 128 of the multiple control surfaces 116. In one embodiment (not shown), some or all of the nacelles 118, 120 are directly connected to the corresponding supporting control surface 126, 128. Each powerplant 112, 114 and its corresponding nacelle 118, 120, pylori 122, 124, and supporting control surface 126, 128 is referred to as a pivoting unit 130, 132.

A user may pivot the supporting control surfaces 126, 128 for various reasons while the aircraft 10 is parked, taking off, in flight, or landing. For example, the supporting control surfaces 126, 128 and corresponding powerplants 112, 114 may be pivoted downward together while the aircraft 100 is parked to facilitate maintenance of the aircraft and powerplants including installation, inspection, and repair of the powerplants as described above regarding other embodiments. Maintenance of the aircraft 100 and powerplants 112, 114 may also include removal of at least one of the powerplants from the fuselage 104. The powerplants 110 can also be adjusted independently or together to facilitate take off or landing by providing various nose-up or nose-down moments about a center of gravity $C_G$ of the aircraft 100 to control aircraft pitch or forces on the aircraft in a pitch direction P. The user may also adjust the powerplants 110 independently or together to control forces on the aircraft in the roll direction R and yaw direction Y to facilitate takeoff and landing. As described above regarding the first embodiment, the control surfaces 116 may also be selectively adjusted to facilitate aircraft 100 take off and landing.

During flight, the powerplants 110 may be adjusted independently or together to control aircraft 100 attitude. For example, the powerplants 110 may be independently pivoted to adjust aircraft 100 attitude in the roll, pitch and/or yaw directions R, P, Y, respectively. Aircraft 100 flight characteristics including aircraft attitude can also be adjusted by changing an amount of thrust produced by one or both powerplants 110. Also, as described above regarding other embodiments, the control surfaces 116 besides the supporting control surfaces 126, 128 can be adjusted separate from or simultaneously with the powerplants 110 to control aircraft 100 flight. The aircraft 100 is otherwise identical to the aircraft of the first embodiment and therefore will not be described in further detail.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. Aircraft comprising:
   a blended wing body (BWB) airframe having a center of gravity and a trailing edge, at least one central control surface pivotally connected adjacent the trailing edge, and elevators pivotally connected at the trailing edge; and
   a powerplant connected to a central control surface such that the powerplant is hinged to an upper surface of the BWB airframe at an axis between the trailing edge and the center of gravity, the powerplant producing exhaust during operation of the aircraft and being selectively pivotable to direct exhaust at multiple angles with respect to the airframe, the powerplant being a distance from the airframe's center of gravity to assist the elevators in rotating the airframe about its center of gravity.

2. Aircraft as set forth in claim 1 wherein said powerplant is selectively pivotable to direct exhaust to exit the aircraft at multiple angles within a range of angles extending from above horizontal to below horizontal.

3. Aircraft as set forth in claim 1 further comprising: a pylon mounted on said control surface; and a nacelle housing said powerplant mounted on the pylon.

4. Aircraft as set forth in claim 1 further comprising:
   a hinge system connecting said control surface to the airframe adjacent the trailing edge; and
   an actuation system mounted on said airframe operatively connected to said control surface for pivoting the control surface with respect to the fuselage about said hinge system.

5. Aircraft as set forth in claim 4 wherein said actuation system includes an actuator selected from a group of actuators consisting of a screw-jack actuator and a hydraulic actuator.

6. Aircraft as set forth in claim 4 wherein said hinge system connects said control surface to the airframe adjacent a top of the airframe; and said actuation system connects said control surface to the airframe adjacent a bottom of the airframe.

7. Aircraft as set forth in claim 6 wherein: said control surface has an upper portion connected to said hinge system and a lower portion opposite said upper portion; and the airframe has a compartment receiving said lower portion of the control surface when said powerplant is adjusted to direct exhaust to exit the aircraft at an angle below horizontal.

8. Aircraft as set forth in claim 1 wherein the aircraft includes a plurality of control surfaces and a plurality of powerplants mounted on the control surfaces, each powerplant producing exhaust and being independently pivotable with respect to the airframe during operation of the aircraft.

9. The Aircraft as set forth in claim 1 wherein the airframe has a compartment receiving a lower portion of the control surface when the powerplant is adjusted to direct exhaust to exit the aircraft at an angle below horizontal.

10. An aircraft comprising:
    an airframe;
    a control surface and a hinge system for pivotally connecting the control surface at an aft end of the airframe, an upper portion of the control surface connected to said hinge system, the hinge system connecting the control surface to the airframe adjacent a top of the airframe;
    a powerplant connected to the control surface so the control surface and powerplant pivot together with respect to the airframe; and
    an actuation system mounted on the airframe and operatively connected to the control surface for selectively pivoting the powerplant to direct exhaust at multiple angles with respect to the airframe, the actuation system connecting the control surface to the airframe adjacent a bottom of the airframe;
    wherein the airframe has a compartment for receiving a lower portion of the control surface when the powerplant is adjusted to direct exhaust to exit the aircraft at an angle below horizontal.

* * * * *